(12) United States Patent
Zhu

(10) Patent No.: US 12,158,688 B2
(45) Date of Patent: Dec. 3, 2024

(54) CAMERA STRUCTURE OF TERMINAL DEVICE

(71) Applicant: SHANGHAI FUSAIMENGYANG TECHNOLOGY CO., LTD, Shanghai (CN)

(72) Inventor: Winly Zhu, Shanghai (CN)

(73) Assignee: SHANGHAI FUSAIMENGYANG TECHNOLOGY CO., LTD, Shanghai (CN)

(*) Notice: Subject to any disclaimer, the term of this patent is extended or adjusted under 35 U.S.C. 154(b) by 22 days.

(21) Appl. No.: 18/091,957

(22) Filed: Dec. 30, 2022

(65) Prior Publication Data
US 2023/0147010 A1 May 11, 2023

Related U.S. Application Data

(63) Continuation of application No. PCT/CN2021/070616, filed on Jan. 7, 2021.

(30) Foreign Application Priority Data

Jun. 30, 2020 (CN) .................... 202010611064.0
Jul. 27, 2020 (CN) .................... 202010729125.3
(Continued)

(51) Int. Cl.
G03B 17/02 (2021.01)
G06F 1/16 (2006.01)
H04N 23/51 (2023.01)

(52) U.S. Cl.
CPC ........... G03B 17/02 (2013.01); G06F 1/1686 (2013.01); H04N 23/51 (2023.01)

(58) Field of Classification Search
CPC ...... G03B 17/02; G03B 17/04; G03B 17/561; G03B 30/00; G06F 1/1686; G06F 1/1626;
(Continued)

(56) References Cited

U.S. PATENT DOCUMENTS

2006/0202095 A1   9/2006 Shao et al.
2019/0250667 A1* 8/2019 Fan ..................... H04M 1/0237
(Continued)

FOREIGN PATENT DOCUMENTS

CN   109204177 A      1/2019
CN   208862945   *    5/2019
(Continued)

OTHER PUBLICATIONS

International Search Report of PCT/CN2021/070616.
Written Opinion of PCT/CN2021/070616.

Primary Examiner — Albert H Cutler

(57) ABSTRACT

The present disclosure relates to a camera structure of a terminal device. An accommodating cavity with an opening is disposed in the terminal device. A lift structure body is disposed inside the accommodating cavity and a camera assembly is disposed on a top of the lift structure body. The accommodating cavity is further provided with a lift drive mechanism for driving the lift structure body to protrude or retract the camera assembly out of or into the accommodating cavity via the opening and a rotation drive mechanism for driving the camera assembly to rotate. The camera assembly is mounted insides in the present disclosure. The camera assembly can be hidden inside the terminal device. The camera assembly can perform operations such as lifting and rotation to perform shooting at multiple angles at the same time, thus replacing and expanding the functions of the front and rear cameras.

22 Claims, 16 Drawing Sheets

(30) Foreign Application Priority Data

Aug. 14, 2020 (CN) .......................... 202010818064.8
Sep. 19, 2020 (CN) .......................... 202022060514.X
Sep. 29, 2020 (CN) .......................... 202011049802.3
Dec. 16, 2020 (CN) .......................... 202011483717.8

(58) Field of Classification Search
CPC ...... H04N 23/51; H04N 23/57; H04N 23/695;
H04M 1/18; H04M 2250/20; H04M
1/0264; H04M 1/0237; H04M 1/185
See application file for complete search history.

(56) References Cited

U.S. PATENT DOCUMENTS

| | | | |
|---|---|---|---|
| 2019/0253537 A1* | 8/2019 | Fan ..................... | H04M 1/0264 |
| 2020/0154005 A1* | 5/2020 | Han ..................... | F16M 11/105 |
| 2020/0244786 A1* | 7/2020 | Zeng ..................... | H04N 23/50 |
| 2021/0136284 A1* | 5/2021 | Gopalakrishna ....... | H04N 23/75 |

FOREIGN PATENT DOCUMENTS

| | | | |
|---|---|---|---|
| CN | 109842702 A | | 6/2019 |
| CN | 109873940 A | | 6/2019 |
| CN | 209375709 U | | 9/2019 |
| CN | 110650363 A | | 1/2020 |
| CN | 209930310 U | | 1/2020 |
| CN | 210297895 U | | 4/2020 |
| CN | 111182186 | * | 5/2020 |
| CN | 111182186 A | | 5/2020 |
| CN | 111225085 A | | 6/2020 |

* cited by examiner

CAMERA STRUCTURE OF TERMINAL DEVICE

CROSS-REFERENCE TO RELATED APPLICATIONS

This application is a bypass continuation application of PCT/CN2021/070616. This application claims priorities from PCT Application No. PCT/CN2021/070616, filed Jan. 7, 2021, and from the Chinese patent applications 202010611064.0 filed Jun. 30, 2020, 202010729125.3 filed Jul. 27, 2020, 202010818064.8 filed Aug. 14, 2020, 202022060514.X filed Sep. 19, 2020, 202011049802.3 filed Sep. 29, 2020, and 202011483717.8 filed Dec. 16, 2020, the content of which are incorporated herein in the entirety by reference.

TECHNICAL FIELD

The present disclosure relates to the technical field of cameras of terminal devices and in particular to a camera structure of a terminal device, which is capable of protecting a camera and shooting at multiple angles.

BACKGROUND

Along with the development of scientific technologies, terminal devices such as smartphones have become indispensable articles for people. Further, along with the development of terminal devices, the terminal devices have greater functionality and users have higher requirements for the terminal devices.

At present, with smartphones as an example, the rear cameras of the back housings of most smartphones (where a corresponding display screen surface is a front surface) are typically exposed. Since cameras are precision devices, they are easily worn out or damaged. At the same time, to place the exposed rear camera, the back surface of a smartphone typically needs to have a hole in it, resulting in lower strength and safety of the back surface and the entirety of the smartphone. The rear cameras are easily impacted, worn out, or damaged due to their outside exposure. For this reason, users usually adopt the following two ways to provide protection: screen film and smartphone casing. The screen film may have a degree of impact on the sharpness of the camera and may be worn out after a long time of use and need to be replaced, resulting in waste. Hence, it is not environmentally friendly. Further, the use of a smartphone casing may affect heat dissipation of the smartphone, shortening the service life of the smartphone. In addition, the use of a smartphone casing may expose the camera and thus cannot completely protect the camera.

At the same time, front and rear groups of cameras disposed on a smartphone result in higher material costs and higher production and processing costs, leading to waste and affecting environmental protection. When a user uses a camera, the user generally uses only the front or rear cameras rather than both the front and rear cameras simultaneously. The use of two groups of cameras in one smartphone leads to a lower use rate, which is also considered a waste. Existing lift cameras may be easily penetrated by a large amount of dust, affecting normal use of the smartphones. Therefore, a smartphone camera structure capable of protecting a camera and shooting at multiple angles is proposed to solve the above problems.

SUMMARY

For the shortcomings of the prior arts, the present disclosure provides a camera structure of a terminal device in which only one camera assembly is disposed. The camera assembly can be hidden in a smartphone body when not used. Hence, the camera assembly can perform lift and rotation operations and the like to shoot at multiple angles at the same time, to replace and expand the functions of the front and rear cameras, thus solving the following problems: two groups of cameras are disposed respectively in an existing smartphone; use of two groups of cameras disposed in one smartphone leads to lower use rate, material waste, and higher costs; the rear cameras occupy the space of the back surface of the smartphone, affecting the strength and safety of the back surface and the entirety of the smartphone; and the rear cameras are exposed to outside and cannot be well protected and thus may be easily damaged or penetrated by dust and so on.

To address the above technical problems, the present disclosure provides the following technical solution.

A camera structure of a terminal device is provided. The terminal device is internally provided with an accommodating cavity with an opening. The accommodating cavity is internally provided with a lift structure body. A camera assembly is disposed on a top of the lift structure body. The accommodating cavity is further provided with a lift drive mechanism for driving the lift structure body to protrude or retract the camera assembly out of or into the accommodating cavity via the opening and a rotation drive mechanism for driving the camera assembly to rotate.

In the above technical solution, the camera structure of the terminal device of the present disclosure can perform the entire lift under the drive of the lift drive mechanism such that the camera assembly can protrude out of the terminal device or retract into the terminal device; the rotation drive mechanism can drive the camera assembly to rotate 360° such that the camera can stop at any angle for shooting. Thus, with only one group of cameras, the user can perform shooting at multiple angles (including front and rear), saving the space of the front cameras and the costs of one camera assembly and improving the use rate of the camera assembly. Further, the exposed rear cameras are eliminated and the back housing of the smartphone body will be more complete to form one integral back plate. Moreover, there is no need to reserve a hole for the rear cameras, thus increasing the strength of the back housing and the entirety of the smartphone.

BRIEF DESCRIPTIONS OF THE DRAWINGS

DETAILED DESCRIPTIONS OF EMBODIMENTS

Embodiment 1

Figure 1:
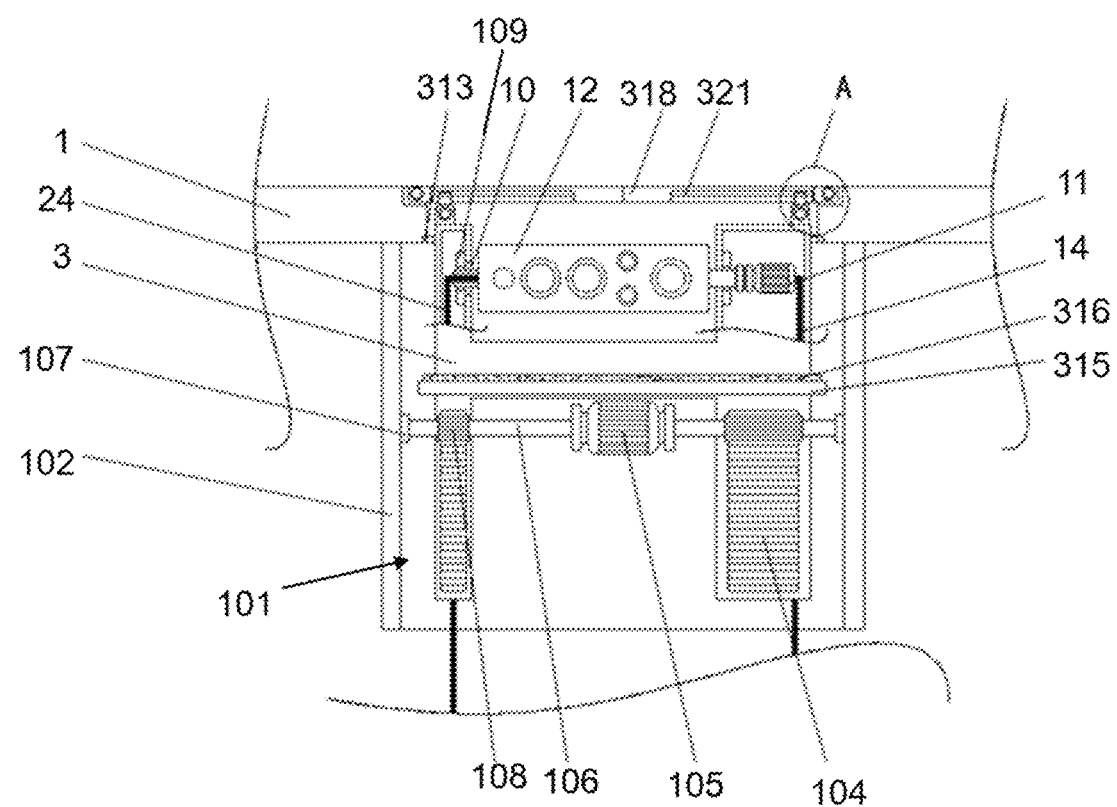
FIG. 1 is a sectional view of a camera structure of a smartphone according to an embodiment 1 of the present disclosure.
Figure 2:
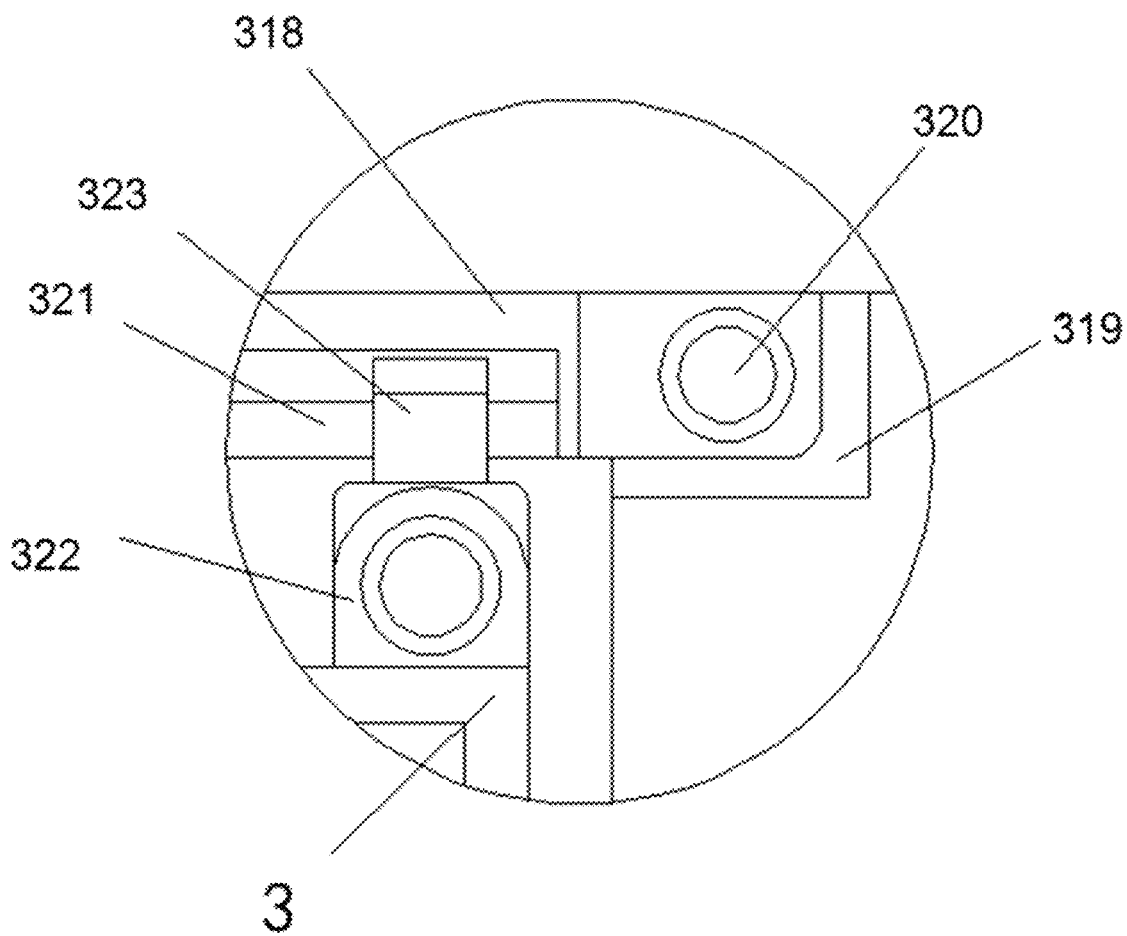
FIG. 2 is a structure schematic diagram of a position A in FIG. 1 of the embodiment 1.
Figure 3:
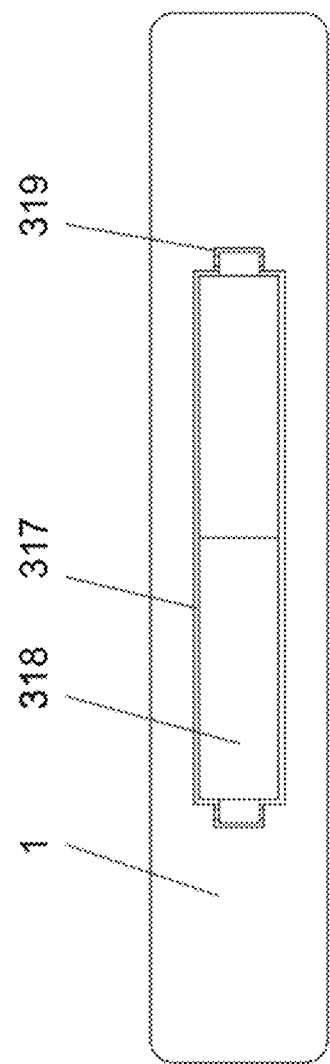
FIG. 3 is a top view of the camera structure of the smartphone of the embodiment 1.
Figure 4:
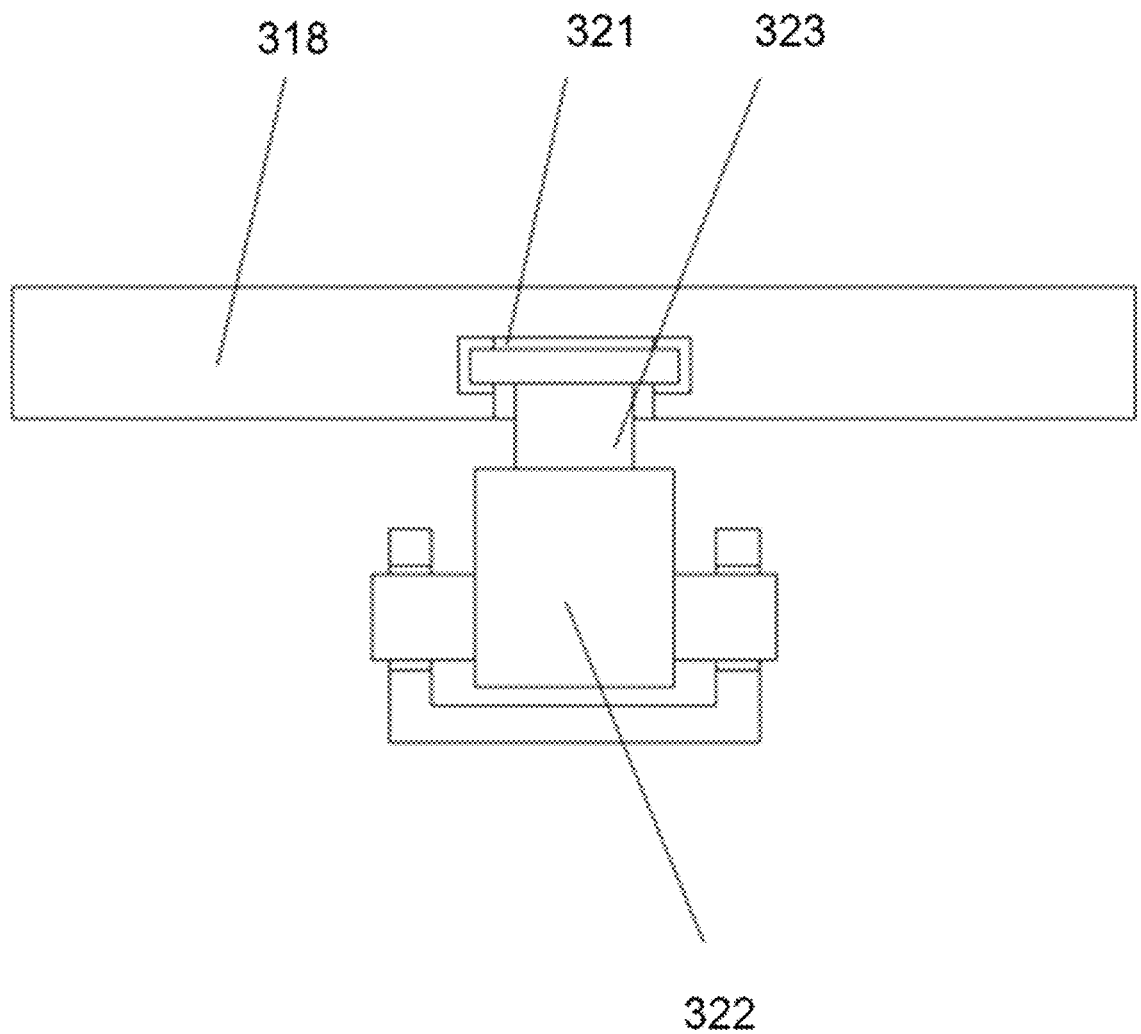
FIG. 4 is a structural schematic diagram of a rotational seat of the embodiment 1.
Figure 5:
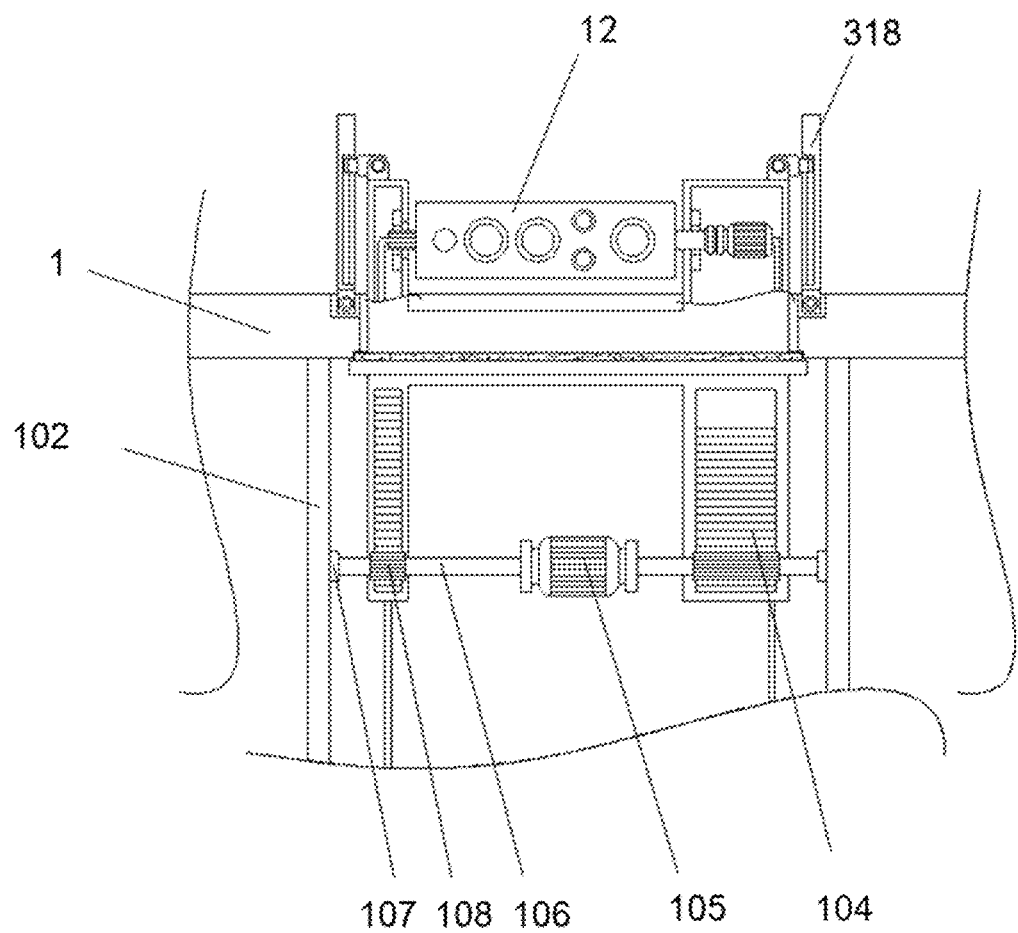
FIG. 5 is a structural display diagram of a camera assembly according to the embodiment 1.

Referring to FIGS. 1 to 5, with a smartphone as an example, a camera structure of a terminal device of the present embodiment may include a smartphone body 1 having an accommodating cavity 101 with only the top opened. A fixing apparatus 102 is fixedly mounted inside the accommodating cavity 101, and a lift structure body 3 is movably mounted inside the fixing apparatus 102. The lift structure body 3 is internally hollow and H-shaped. A fitting tooth 104 is fixedly connected at a front surface of each of the left and right sides of a bottom of the lift structure body 3, and a lift motor located on the front surface of the lift structure body 3 is fixedly mounted inside the fixing apparatus 102. The lift motor is a dual-head motor 105. An output shaft of each of the left and right sides of the dual-head motor 105 is fixedly connected with a rotational rod 106, and a rotational bearing 107 movably connected with the rotational rod 106 is fixedly mounted at an inner wall of each of the left and right sides of the fixing apparatus 102. A rotational gear 108 is fixedly mounted at an outer portion of each of the two rotational rods 106. The rotational gears 108 are matched with the fitting teeth 104 and the rotational gears 108 mesh with the fitting teeth 104. A transmission bearing 109 is fixedly mounted at an inner wall of each of the left and right sides of the lift structure body 3 and a transmission rod 10 is movably mounted inside each of the two transmission bearings 109. A transmission motor 11 is fixedly mounted inside the lift structure body 3. The right transmission rod 10 extends into the lift structure body 3 through the right transmission bearing 109. Further, an output shaft of transmission motor 11 is fixedly connected with the right transmission rod 10 through a coupling. A camera assembly 12 is fixedly connected between the two transmission rods 10. A matching groove 313 is disposed at an inner top wall at the opening of the smartphone body 1. A power line 14 is movably mounted inside the lift structure body 3 and a transmission line 24 is movably mounted inside the lift structure body 3. Both ends of the power line 14 are fixedly connected to the transmission motor 11 and a main board of the smartphone respectively, and both ends of the transmission line 24 are fixedly connected to the camera assembly 12 and the main board of the smartphone respectively. One camera assembly 12 is movably mounted inside the smartphone body 1. The camera assembly 12 is transversely disposed. The camera assembly 12 can rotate 360 degrees between the two transmission bearings 109 through the transmission rods 10. The camera assembly 12 can be safely received inside the smartphone body 1. A support portion 315 is fixedly connected with an outer portion of the lift structure body 3. A sealing gasket 316 is fixedly connected at the top of the support portion 315. The sealing gasket 316 can be matched in size with the matching groove 313. The sealing gasket 316 is movably connected inside the matching groove 313. A telescoping opening 317 (i.e. the top opening of the accommodating cavity 101) is opened at the top of the smartphone body 1. Two movable sealing plates 318 are movably mounted inside the telescoping opening 317. A rotational groove 319 located on the top of the smartphone body 1 is opened at each of the left and right sides of the telescoping opening 317. A rotational block 320 movably connected with the rotational groove 319 is fixedly connected with each of a front surface and a back surface of a side where the two movable sealing plates 318 are separated. A rotational hole matching the rotational block 320 is opened on each of a front surface wall and a back surface wall of the rotational groove 319, and the rotational groove 319 is movably connected with the rotational block 320 via the rotational holes. A bottom of the movable sealing plates 318 is provided with a sliding groove 321. A rotational seat 322 is fixedly connected at each of the left and right sides of the top of the lift structure body 3. A top of the rotational seat 322 is fixedly connected with a sliding block 323 capable of rotating right and left relative to the rotational seat 322. The sliding groove 321 is a T-shaped groove and a head portion of the sliding block 323 is a T-shaped head disposed in the sliding groove 321.

In conclusion, in the camera structure of the terminal device of the present embodiment, the fixing apparatus 102 is disposed inside the smartphone body 1, and the dual-head motor 105, the rotational rods 106, the rotational bearings 107, and the rotational gears 108 are disposed inside the fixing apparatus 102, such that the two rotational rods 106 can rotate inside the fixing apparatus 102 through the dual-head motor 105 and the rotational bearings 107, to bring the external rotational gears 108 to rotate. The lift structure body 3 is disposed inside the fixing apparatus 102 and the fitting teeth 104 meshed with the rotational gears 108 are disposed on the lift structure body 3, and the telescoping opening 317 is disposed on the top of the smartphone body 1. In this case, the lift structure body 3 can perform lifting through rotation of the rotational gears 108, to achieve the lifting effect of the camera assembly 12. Thus, the camera assembly 12 can be hidden in the smartphone body 1 when not used, to better protect the camera. When camera assembly 12 is to be used, camera assembly 12 can be lifted out of the smartphone body 1 by using the lift structure body 3. The movable sealing plates 318, the rotational grooves 319, and the rotational blocks 320 are disposed on the smartphone body 1, and the lift structure body 3 is movably connected with the movable sealing plates 318 through the rotational seats 322 and the sliding grooves 321. Thus, the movable sealing plates 318 can open along with the ascent of the lift structure body 3 and close along with the descent of the lift structure body 3, to prevent the entry of dust when the camera assembly 12 is not used. The support portion 315 and the sealing gasket 316 are disposed on the outer portion of the lift structure body 3 and the matching groove 313 is disposed at the inner bottom wall of the smartphone body 1, such that entry of dust can be prevented at the time of ascent of the lift structure body 3 by using the matching of the sealing gasket 316 and the matching groove 313, thereby achieving good dust prevention effect. The transmission bearings 109, the transmission rods 10, the transmission motor 11, and the camera assembly 12 are disposed on the lift structure body 3. The camera assembly 12 is transversely disposed such that the transmission rod 10 can rotate by using the transmission bearings 109, the transmission rod 10, and the power of the transmission motor 11, to drive the camera assembly 12 to perform back-and-forth rotation. Thus, the camera can stop at any angle for shooting especially in a confined space. Thus, with only one camera assembly 12, the user can perform shooting at multiple angles (including front and rear), saving the space of the front cameras and the costs of one camera assembly and improving the use rate of the camera assembly. Further, the exposed rear cameras are eliminated and the back housing of the smartphone body 1 will be more complete. Moreover, there is no need to reserve a hole for the rear cameras on the back plate of the smartphone, thus increasing the strength of the back housing and the entirety of the smartphone. Further, transverse disposal of camera assembly 12 helps to prevent excessive protrusion of too many cameras disposed, which not only prevents excessive protrusion but also improves the shooting quality with multiple cameras, thus achieving the purpose of lifting, rotation, and dust prevention.

Embodiment 2

Figure 6:
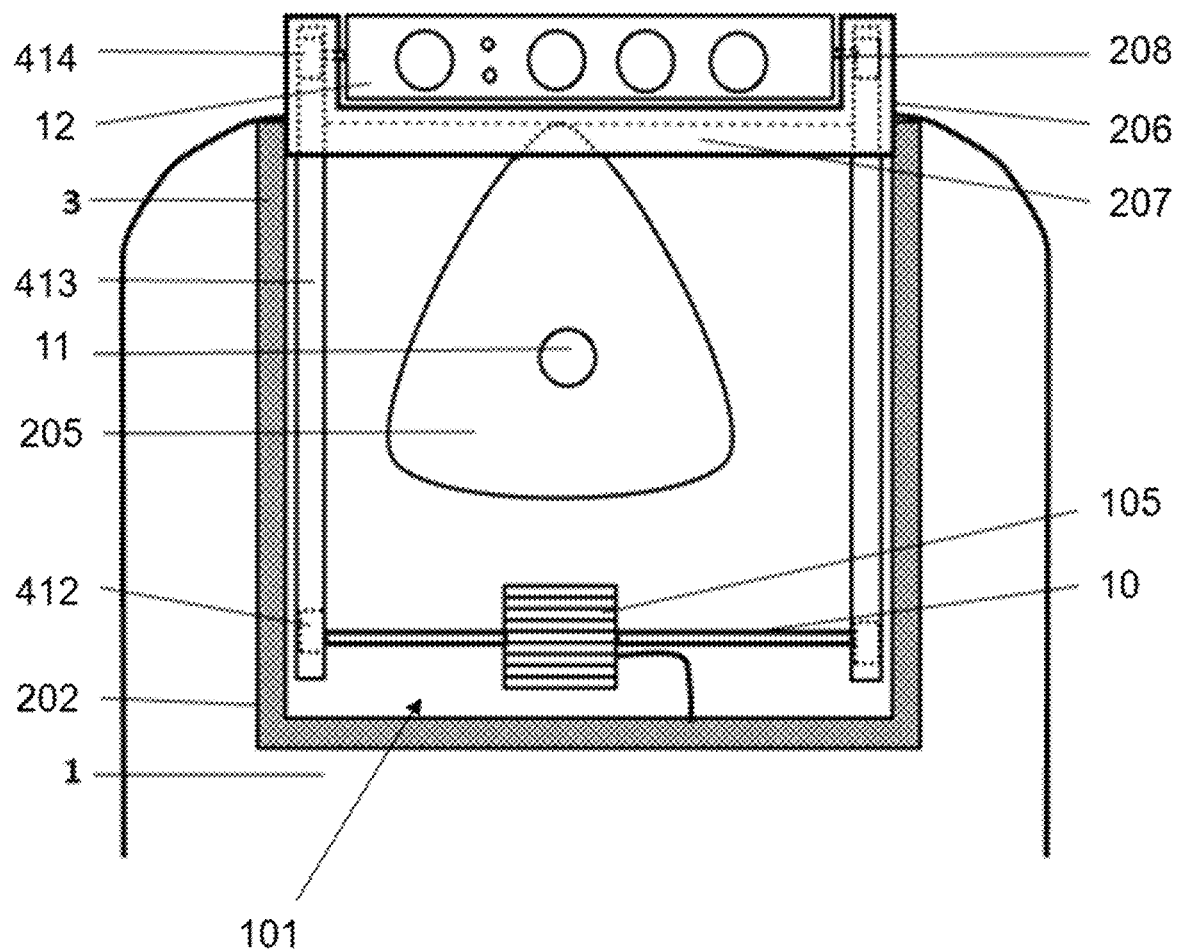
FIG. 6 is a sectional view of a camera structure of a smartphone of an embodiment 2.
Figure 7:
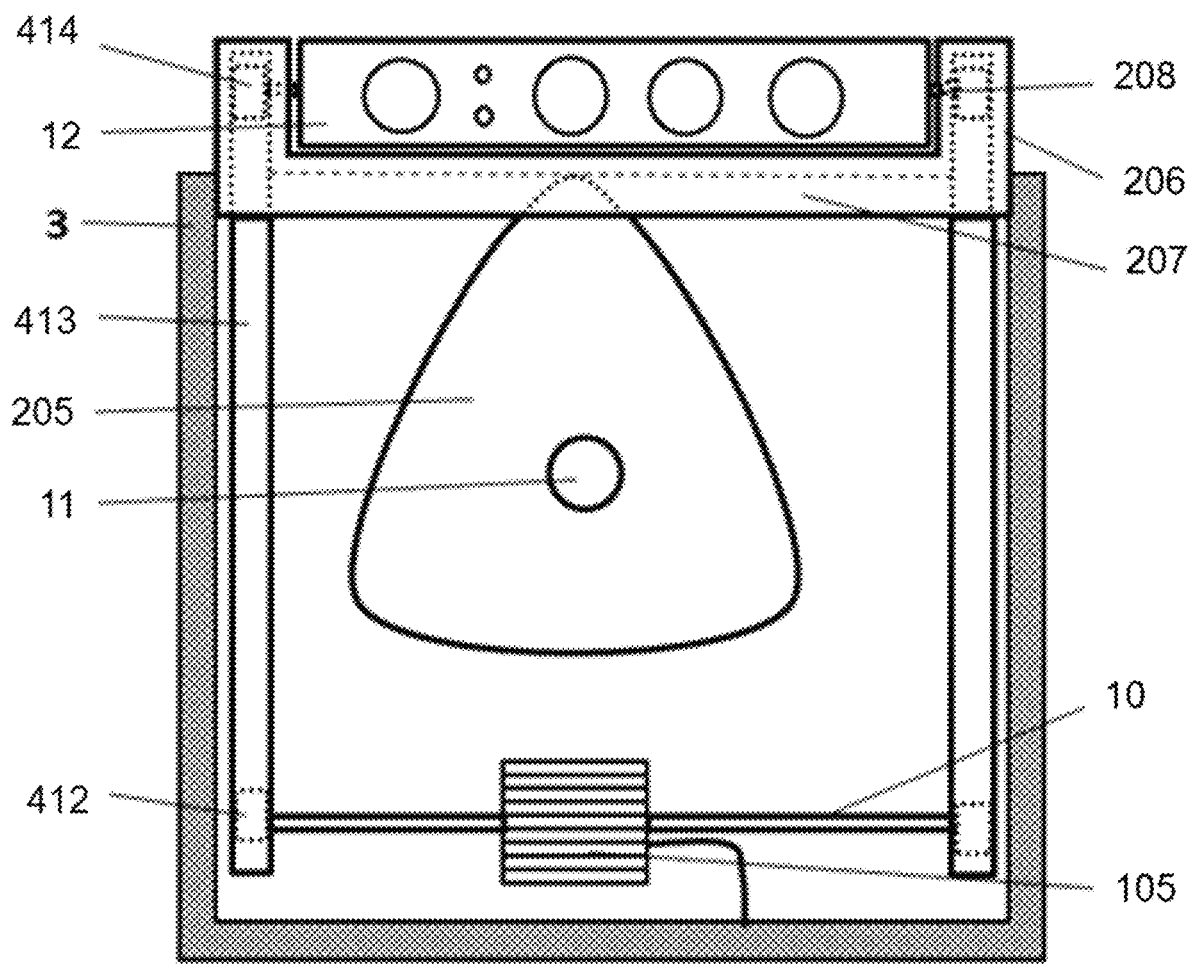
FIG. 7 is a body front view of a lifted camera of the embodiment 2.
Figure 8:
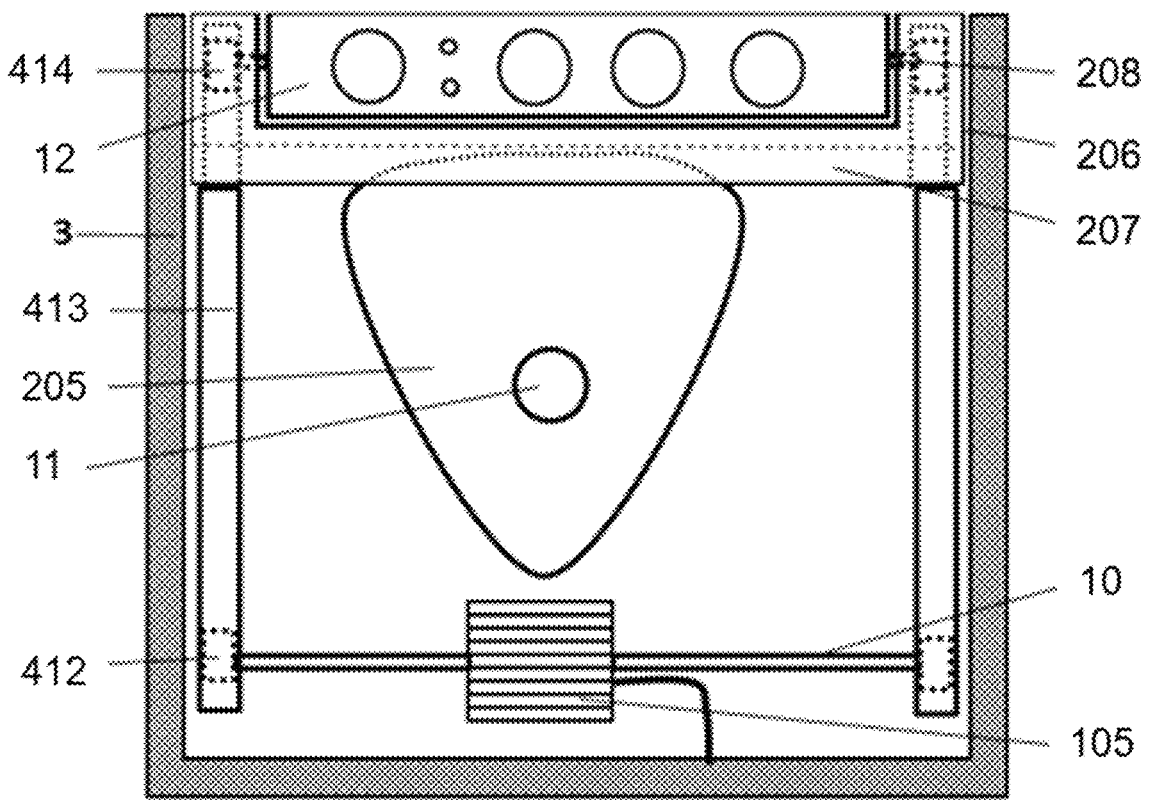
FIG. 8 is a body front view of an un-lifted camera of the embodiment 2.
Figure 9:
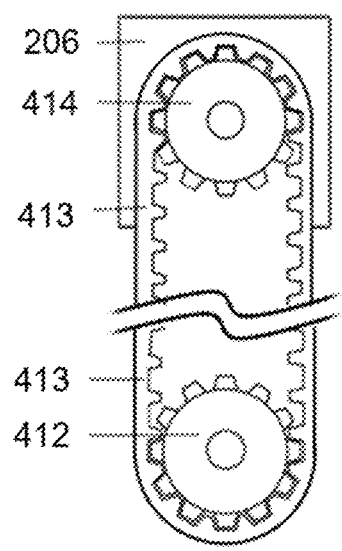
FIG. 9 is a side view of a camera structure of a smartphone of the embodiment 2.
Figure 10:
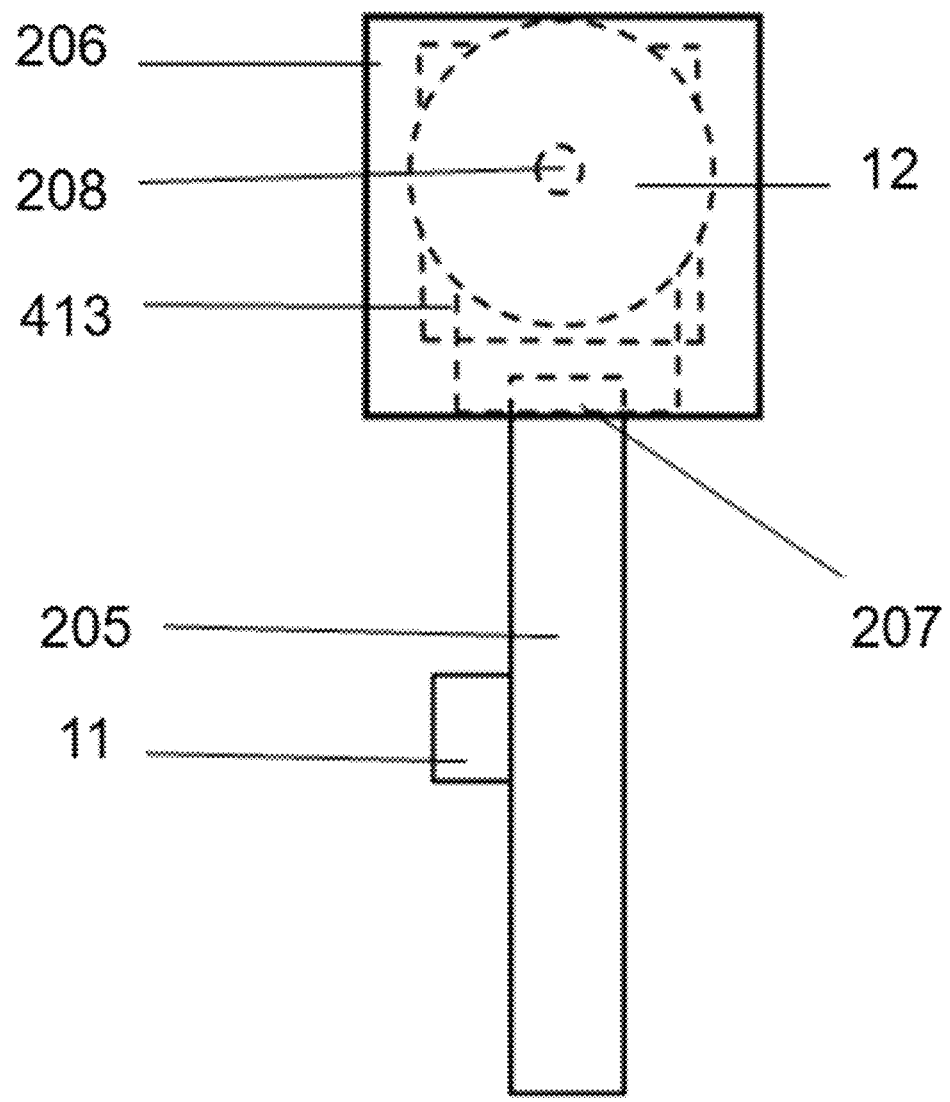
FIG. 10 is a side view of a camera structure of a smartphone of the embodiment 2 (supplementing the part blocked by a gear and a transmission belt in FIG. 9).
Figure 11:
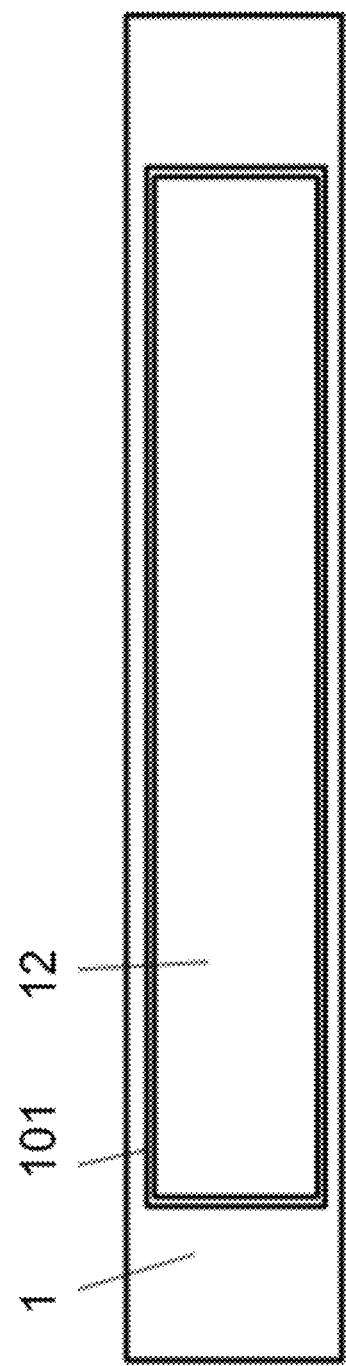
FIG. 11 is a top view of a camera structure of a smartphone of the embodiment 2.

By referring to FIGS. 6 to 11, with a smartphone as an example, the camera structure of the terminal device of the present embodiment includes a smartphone body 1 inside which an accommodating cavity 101 (i.e. matching groove) with only top opened is formed. A lift structure body 3 is fixedly mounted inside the accommodating cavity 101 and a transmission motor 11 is fixedly mounted inside the lift structure body 3. An output shaft of the transmission motor 11 is fixedly connected with a geometric rotational sheet 205, where an edge of the geometric rotational sheet has unequal distances from a rotational center. The geometric rotational sheet is movably connected with a support frame 206 of the lift structure body 3, and a fitting sliding groove 207 is opened at a bottom of the support frame 206, where the fitting sliding groove 207 is matched in size with the geometric rotational sheet 205. In the present embodiment, the geometric rotational sheet 205 is an equilateral-triangle rotational sheet, and the edge of the geometric rotational sheet 205 is located in the fitting sliding groove 207. A connection rod 208 is movably mounted at both sides of the support frame 206 respectively, and the connection rods 208 are fixedly connected with the camera assembly 12. A dual-head motor 105 is fixedly mounted inside the lift structure body 3, and two output shafts of the dual-head motor 105 are fixedly connected to a transmission rod respectively. A drive gear 412 is fixedly mounted on the transmission rod 10, and the drive gear 412 is matched in size with a synchronous belt 413 and movably connected with the synchronous belt 413. The synchronous belt 413 is matched in size with a driven gear 414 and movably connected with the driven gear 414. A connection rod 208 movably connected with the camera assembly 12 is fixedly mounted on the driven gear 414. The transmission motor 11 and the dual-head motor 105 each are electrically connected to a main board of the smartphone through an electric line, and the camera assembly 12 is electrically connected to the main board of the smartphone through a transmission line.

In conclusion, the accommodating cavity 101 with only the top opened is disposed on the smartphone body 1 of the present embodiment and the lift structure body 3 is fixedly mounted inside the accommodating cavity 101. The transmission motor 11, the geometric rotational sheet 205, and the support frame 206 are disposed inside the lift structure body 3, and the geometric rotational sheet can rotate under the drive of the transmission motor 11 and use its characteristics of unequal distances of the center of the geometric shape from the edge to bring the support frame 206 to ascend or descend. The fitting sliding groove 207 is disposed at the bottom of the support frame 206, where the fitting sliding groove 207 is matched in size with the geometric rotational sheet 205. To effectively fix the position of the geometric rotational sheet 205, the support frame 206 is movably connected with the camera assembly 12 through the connection rods 208, such that the support frame 206 drives the camera assembly 12 to ascend or descend in the accommodating cavity 101. The dual-head motor 105, the transmission rod 10, the driving gear 412, the synchronous belt 413, the driven gear 414, and the connection rod 208 are disposed inside the lift structure body 3. The transmission rod 10 can rotate under the drive of the dual-head motor 105 to drive the driving gear 412 to rotate and further drive the synchronous belt 413 to rotate. When the camera assembly 12 is lifted out of the smartphone body 1, the synchronous belt 413 is in a tensioned state; when the camera assembly 12 is received into the smartphone body 1, the synchronous belt 413 is in a slightly naturally bent state. To reduce the natural bending degree of the synchronous belt 413 when the camera assembly 12 is received into the smartphone body 1 and satisfy the requirements of the camera assembly 12 for length change during a lifting process, the synchronous belt 412 is made of an elastic material. The synchronous belt 413 drives the driven gear 414 to rotate to drive the connection rod 208 to rotate and further drives the camera assembly 12 to flip. The lifting function can enable the camera assembly 12 to be hidden in the smartphone body 1 when the camera assembly 12 is not used, and hence the camera assembly 12 can be well protected. The camera flip function can enable the camera assembly 12 to perform flip switching for front and rear shootings, save space and improve selfie pixels. Further, the camera assembly 12 can take panorama shots using 360-degree rotation. In this way, the following problems can be solved: front and rear cameras are disposed on the existing smartphones; low pixel of the front camera affects the selfie quality; the user is required to move the smartphone smoothly to take a panorama picture, which increases the shooting difficulty and affects the shooting quality.

In addition to the equilateral triangle, the above geometric rotational sheet may also be another shape such as an eccentric disc and cam as long as the distances between the edge and the center are made unequal to use the edge undulation to achieve a lifting effect.

Embodiment 3

Figure 12:
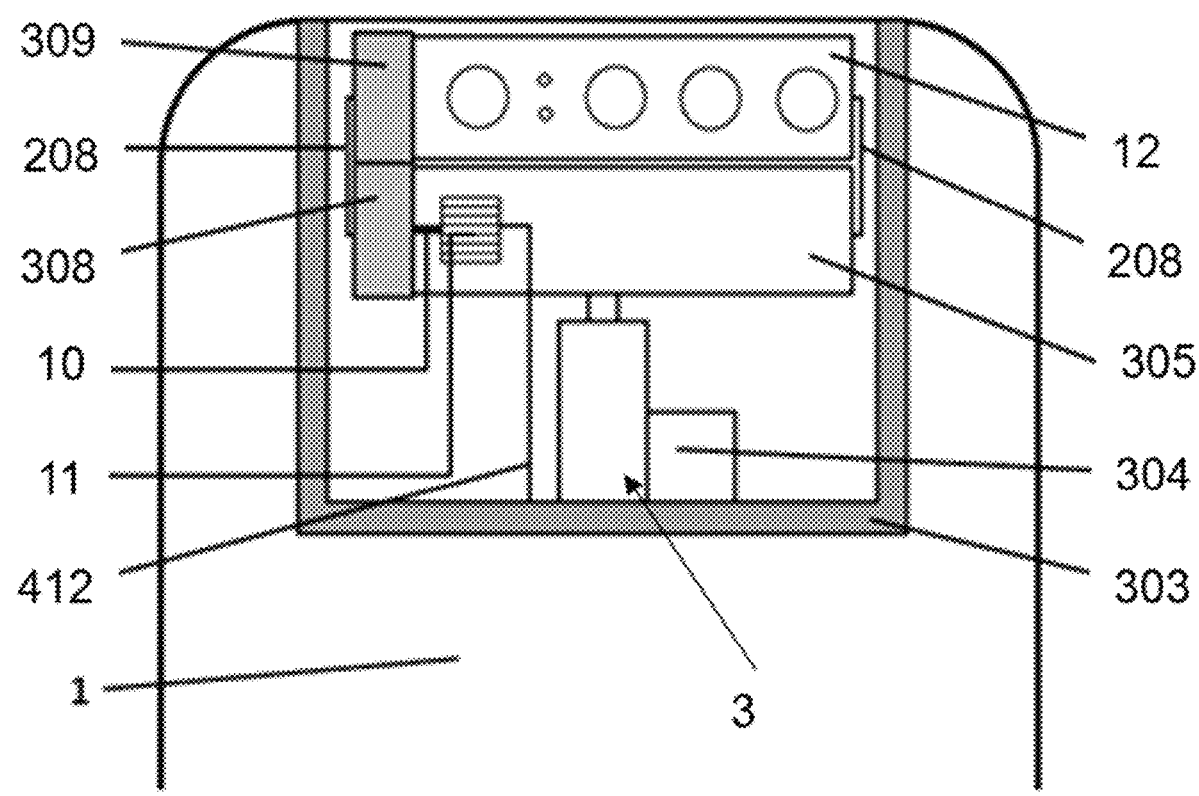
FIG. 12 is a sectional view of a camera structure of a smartphone before a camera is lifted according to an embodiment 3.
Figure 13:
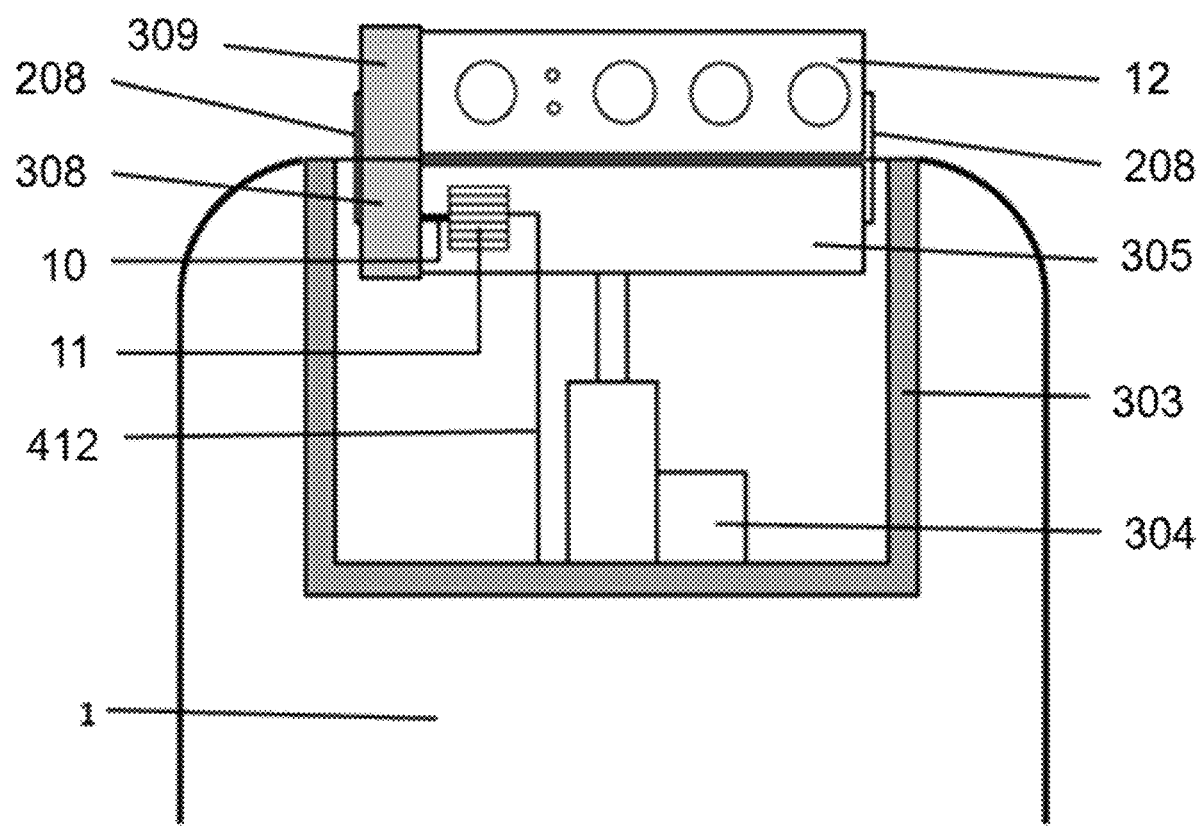
FIG. 13 is a sectional view of a camera structure of a smartphone after a camera is lifted according to the embodiment 3.
Figure 14:
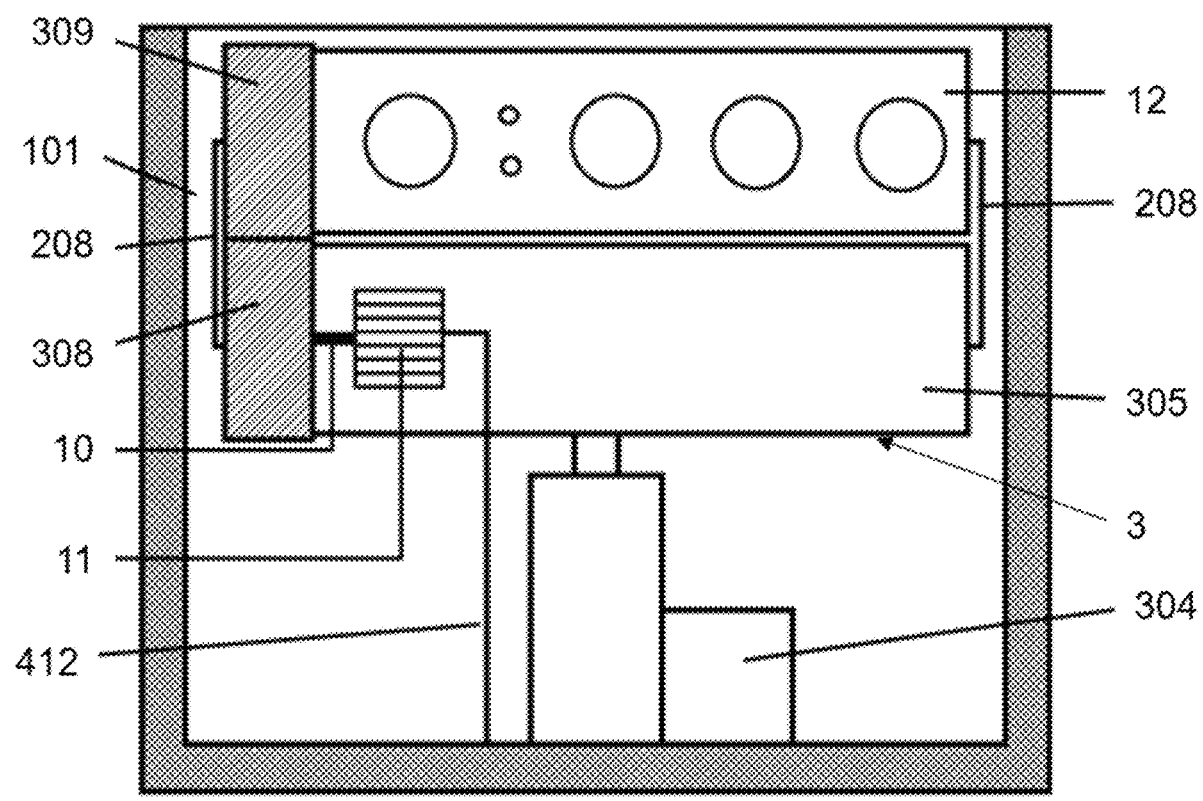
FIG. 14 is a front view of a camera structure of a smartphone before a camera is lifted according to the embodiment 3.
Figure 15:
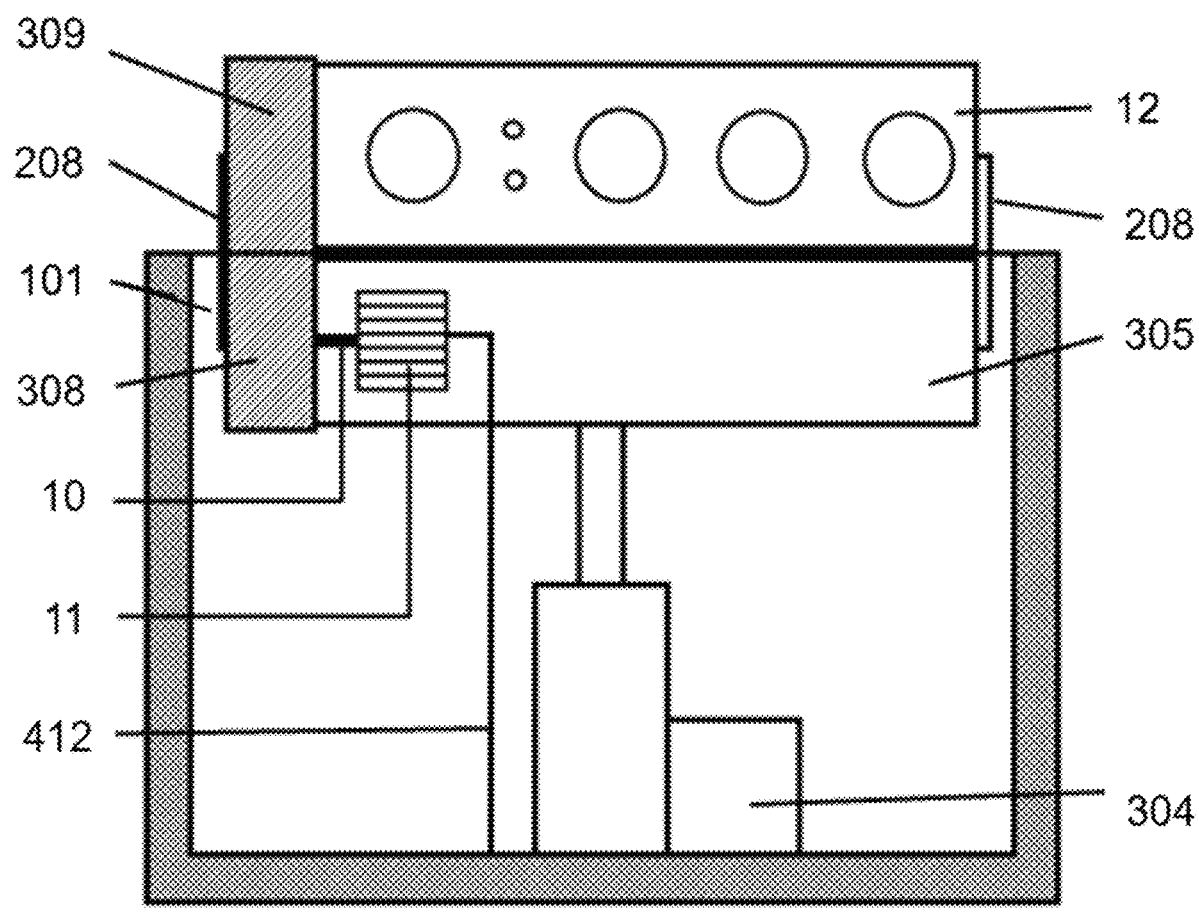
FIG. 15 is a front view of a camera structure of a smartphone after a camera is lifted according to the embodiment 3.
Figure 16:
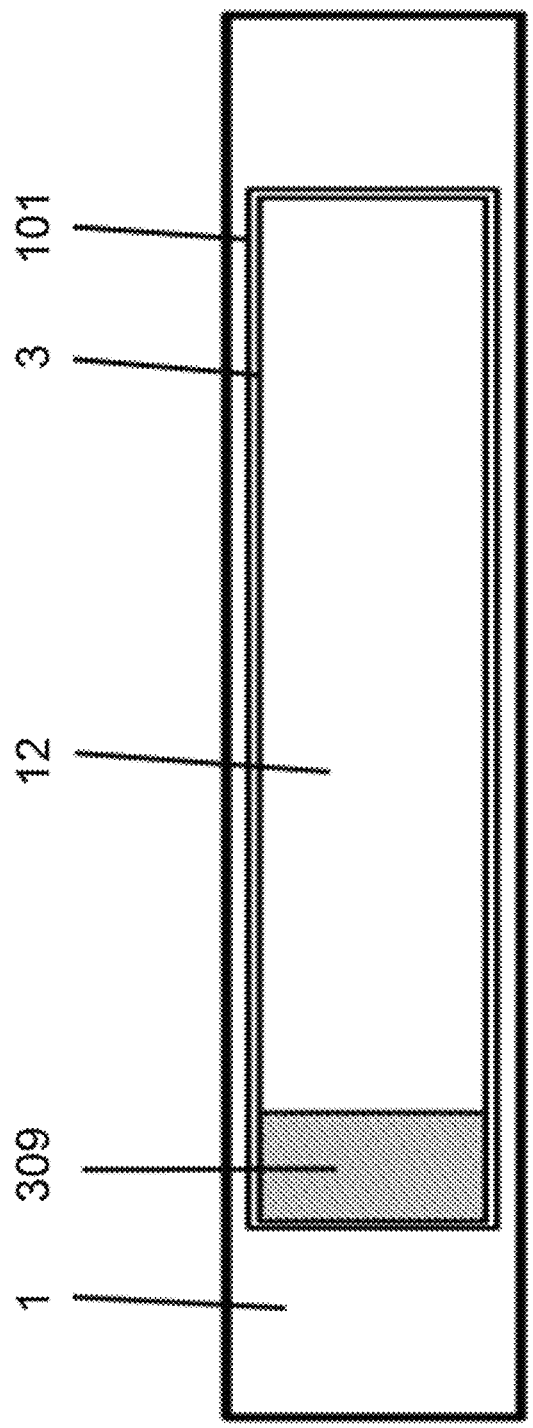
FIG. 16 is a top view of a camera structure of a smartphone according to the embodiment 3.
Figure 17:
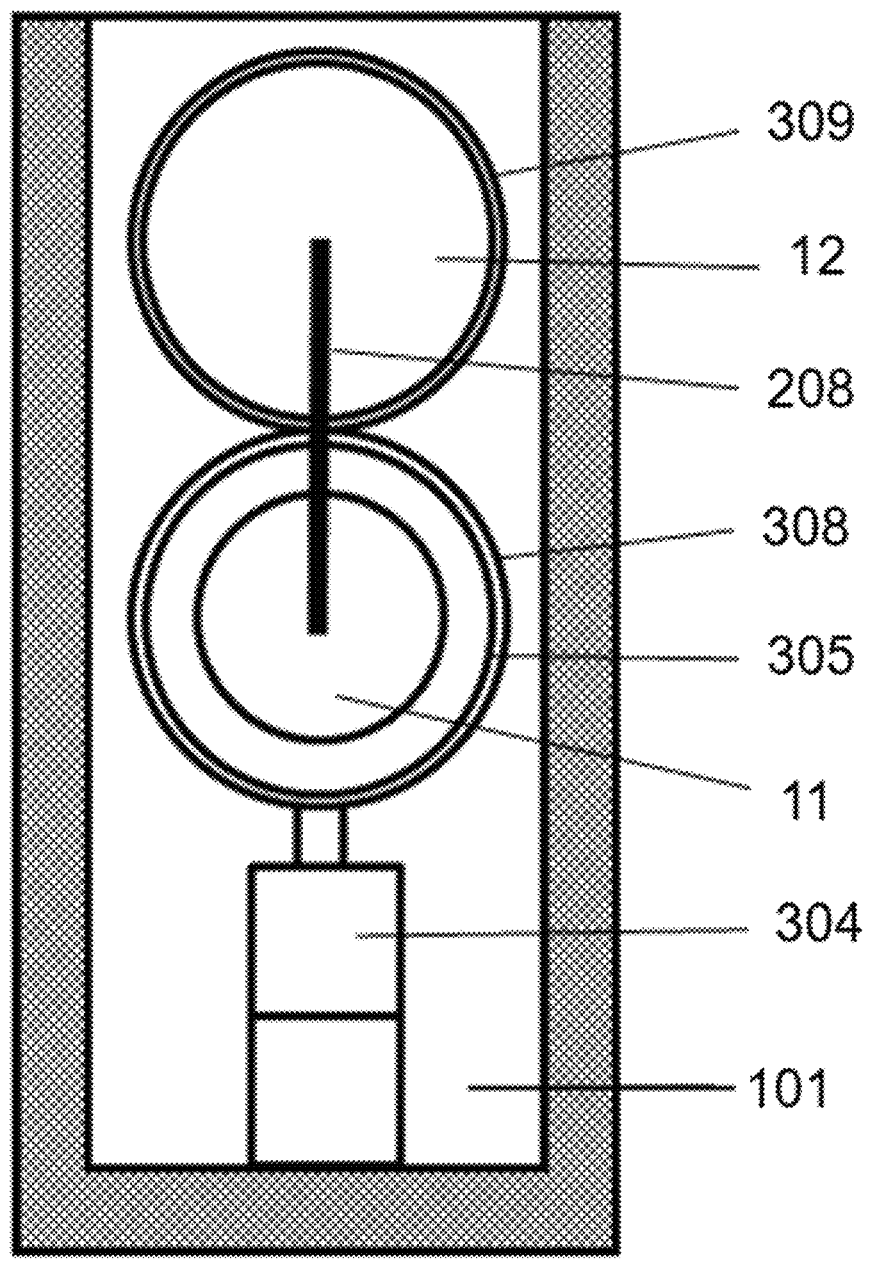
FIG. 17 is a side view of a camera structure of a smartphone according to the embodiment 3.

By referring to FIGS. 12 to 17, with a smartphone as an example, the camera structure of the terminal device of the present embodiment includes a smartphone body 1 inside which an accommodating cavity 101 (i.e. fitting groove) with only the top opened is formed. A lift structure body 3 is fixedly mounted at the bottom of the accommodating cavity inside smartphone body 1. A telescoping rod 304 is fixedly mounted at the bottom of the lift structure body 3. A transmission pipe 305 is fixedly mounted above a push bar of the telescoping rod 304. A transmission motor 11 is fixedly mounted inside transmission pipe 305. A transmission rod 10 is fixedly mounted on an output shaft of the transmission motor 11. A driving block 308 is fixedly mounted on transmission rod 10. The driving block 308 is movably connected with the transmission pipe 305. The driving block 308 is movably connected with a driven block 309 through a connection rod 208. A camera assembly 12 is fixedly connected to the driven block 309. The camera assembly 12 is movably connected with the transmission pipe 305 through connection rod 208. The transmission motor 11 is connected to a main board of the smartphone through an electric line 412.

In conclusion, the accommodating cavity 101 (i.e. fitting groove) with only the top opened is disposed on the smartphone body 1 of the present embodiment and the lift structure body 3 is disposed inside the accommodating cavity 101. The telescoping rod 304, the transmission pipe 305, the driving block 308, the driven block 309, and the connection rod 208 are disposed inside the lift structure body 3. Thus the camera assembly 12 can drive the transmission pipe 305 to ascend or descend through the telescopic movement of the telescoping rod 304. The transmission pipe 305 is movably connected with the driving block 308 to drive the driving block 308 to ascend or descend. The driving block 308 is movably connected with the driven block 309 through the connection rod 208, such that the driving block 308 can drive the driven block 309 to ascend or descend during an ascending or descending process. The driven block 309 is fixedly connected with the camera assembly 12 to drive the camera assembly 12 to ascend or descend. The accommodating cavity 101 is disposed inside the smartphone body 1, the lift structure body 3 is disposed inside the accommodating cavity 101, and the transmission motor 11, the transmission rod 10, the driving block 308, the driven block 309, and the connection rod are disposed inside the lift structure body 3. In this case, camera assembly 12 drives the transmission rod 10 to rotate through the rotation of the transmission motor 11 to drive the driving block 308 to rotate. The driving block 308 and the driven block 309 are movably connected through connection rod 208, where the driving block 308 and the driven block 309 are made of a material with a friction coefficient≥0.1. Thus, the driving block 308 drives the driven block 309 to rotate by using a frictional force of the material. The driven block 309 is fixedly connected with the camera assembly 12 to drive the camera assembly 12 to rotate. The transmission motor 11 is connected to the main board of the smartphone through an electric line 3012. Thus, the lift structure body 3 can enable the camera assembly 12 to perform flip switching between front and rear shootings, save space and improve selfie pixels. Further, the camera assembly 12 can take panorama shots using 360-degree rotation, thus avoiding instability arising from excessive movements of the smartphone and achieving the purpose of omnidirectional rotation. In this way, the following problems can be solved: front and rear cameras are disposed on the existing smartphones; low pixel of the front camera affects the selfie quality; and the smartphone is disabled to achieve a full-screen effect. Moreover, the camera assembly 12 may be received in the smartphone body and thus can be well protected, thereby solving the problem of ease of wear of the camera.

The above camera structure may also be applied to other terminal devices such as tablet computers, laptop computers, drones, robots, or detection instruments.

The "top" and "top wall" mentioned above are based on the direction in which the camera assembly protrudes out. The outer portion of any part consistent with the direction in which the camera assembly protrudes out of the housing may be referred to as the "top" or "top wall".

The above camera assembly includes at least one lamp used as a flashlight or illumination.

Although the embodiments of the present disclosure have been illustrated and described, persons of ordinary skill in the arts may understand that various changes, modifications, substitutions, and variations may be made to these embodiments without departing from the principle and spirit of the present disclosure. The scope of protection of the present disclosure is limited by the appended claims and its equivalents.

What is claimed is:

1. A camera structure for a terminal device, wherein the terminal device is internally provided with an accommodating cavity with an opening, the accommodating cavity is internally provided with a lift structure body, a camera assembly is disposed on a top of the lift structure body, and the accommodating cavity is further provided with a lift drive mechanism for driving the lift structure body to protrude or retract the camera assembly out of or into the accommodating cavity via the opening and a rotation drive mechanism for driving the camera assembly to rotate;

wherein the opening of the accommodating cavity is formed into a telescoping opening, a movable sealing plate is disposed in the telescoping opening, and the movable sealing plate opens or closes along with the ascent or descent of the lift structure body; and two movable sealing plates are provided, a rotational groove located on the top of the housing is opened at each of left and right sides of the telescoping opening, and a rotational block movably connected with the rotational groove is fixedly connected with each of a front surface and a back surface of a side where the two movable sealing plates are separated; a bottom of the sealing plates is provided with a sliding groove, a rotational seat is disposed at each of left and right sides of the top of the lift structure body, a top of the rotational seat is connected with a sliding block capable of rotating relative to the rotational seat, and a head portion of the sliding block is located in the sliding groove.

2. The camera structure of claim 1, wherein a fitting tooth is fixedly connected on a front surface of the lift structure body, and the lift drive mechanism comprises a lift motor fixedly mounted inside the accommodating cavity, a rotational rod connected with the lift motor and a rotational gear disposed on the rotational rod and meshed with the fitting tooth.

3. The camera structure of claim 2, wherein two fitting teeth are fixedly connected on the front surface of the lift structure body, the lift motor is a dual-head motor, and each of both sides of the dual-head motor is connected with one rotational rod.

4. The camera structure of claim 2, wherein the rotation drive mechanism comprises a transmission rod disposed on the lift structure body and a transmission motor capable of driving the transmission rod to rotate, and the camera assembly is disposed on the transmission rod.

5. The camera structure of claim 1, wherein a matching groove is disposed at the opening of the accommodating cavity, an outer portion of the lift structure body is fixedly connected with a support portion, and the support portion is fixedly connected with a sealing gasket matching the matching groove.

6. The camera structure of claim 1, wherein the sliding groove is a T-shaped groove, and the head portion of the sliding block is a T-shaped head.

7. The camera structure of claim 1, wherein a rotational hole matching the rotational block is opened on the rotational groove, and the rotational groove is movably connected with the rotational block through the rotational hole.

8. The camera structure of claim 1, wherein the lift drive mechanism comprises a transmission motor disposed inside the accommodating cavity and a geometric rotational sheet driven by the transmission motor, an edge of the geometric rotational sheet has unequal distances from a rotational center, the lift structure body has a fitting groove, and the edge of the geometric rotational sheet is located inside the fitting groove.

9. The camera structure of claim 8, wherein the geometric rotational sheet is an equilateral-triangle rotational sheet.

10. The camera structure of claim 8, wherein the lift structure body is provided with a connection rod, the camera assembly is disposed on the connection rod, and the rotation drive mechanism is formed by a dual-head motor disposed at an inner bottom of the accommodating cavity and a belt transmission assembly connecting the dual-head motor with the connection rod in a transmission manner.

11. The camera structure of claim 10, wherein the belt transmission assembly is formed by a transmission rod fixedly mounted on an output shaft of the dual-head motor, a driving gear fixed on the transmission rod, a driven gear fixed on the connection rod and a synchronous belt wound on the driving gear and the driven gear.

12. The camera structure of claim 11, wherein the synchronous belt is made of an elastic material.

13. The camera structure of claim 1, wherein the lift drive mechanism is a telescoping rod.

14. The camera structure of claim 13, wherein the rotation drive mechanism is formed by a transmission motor disposed on the lift structure body, a driving block driven by the transmission motor and a driven block driven by the driving block, and the camera assembly is disposed on the driven block.

15. The camera structure of claim 14, wherein the lift structure body is movably connected with the camera assembly through a connection rod.

16. The camera structure of claim 14, wherein the driving block is in friction transmission with the driven block.

17. The camera structure of claim 1, wherein the camera assembly rotates 360° under the drive of the rotation drive mechanism.

18. The camera structure of claim 1, wherein the terminal device is a smart phone or a laptop computer or a tablet computer.

19. The camera structure of claim 1, wherein the camera assembly has at least one camera.

20. The camera structure of claim 19, wherein multiple cameras are transversely arranged on the camera assembly.

21. The camera structure of claim 1, wherein the camera assembly has at least one lamp.

22. The camera structure of claim 1, wherein a back surface of the terminal device is integral.

* * * * *